US012175911B2

(12) United States Patent
Yoon et al.

(10) Patent No.: US 12,175,911 B2
(45) Date of Patent: Dec. 24, 2024

(54) LUMINANCE DIFFERENCE CORRECTION METHOD AND LIGHT EMITTING DISPLAY APPARATUS USING THE SAME

(71) Applicant: LG Display Co., Ltd., Seoul (KR)

(72) Inventors: YeoMyeong Yoon, Paju-si (KR); Li-Jin Kim, Paju-si (KR); HyunJun Min, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/073,306

(22) Filed: Dec. 1, 2022

(65) Prior Publication Data

US 2023/0215324 A1 Jul. 6, 2023

(30) Foreign Application Priority Data

Dec. 31, 2021 (KR) ........................ 10-2021-0194753

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2300/0871* (2013.01); *G09G 2310/027* (2013.01); *G09G 2310/08* (2013.01); *G09G 2320/0233* (2013.01); *G09G 2320/0247* (2013.01);
(Continued)

(58) Field of Classification Search
CPC ............... G09G 3/2007; G09G 3/3233; G09G 2300/0819; G09G 2300/0842; G09G 2300/0871; G09G 2310/027; G09G 2310/08; G09G 2320/0233; G09G 2320/0247; G09G 2320/0276; G09G 2320/045; G09G 2320/0693; G09G 2330/028; G09G 2360/147
See application file for complete search history.

(56) References Cited

U.S. PATENT DOCUMENTS

| | | | | |
|---|---|---|---|---|
| 8,988,470 B2 * | 3/2015 | Kang | G09G 3/3208 345/690 |
| 2012/0154628 A1 * | 6/2012 | Horiuchi | H04N 23/73 348/226.1 |

(Continued)

FOREIGN PATENT DOCUMENTS

| | | |
|---|---|---|
| KR | 10-2012-0069564 A | 6/2012 |
| KR | 10-2017-0050748 A | 5/2017 |
| KR | 10-1861795 B1 | 5/2018 |

*Primary Examiner* — Amare Mengistu
*Assistant Examiner* — Jennifer L Zubajlo
(74) *Attorney, Agent, or Firm* — Birch, Stewart, Kolasch & Birch, LLP

(57) ABSTRACT

A luminance difference correction method and a light emitting display apparatus using the same is discussed. The luminance difference correction method can include receiving by an camera an image, which is output from a camera region of a light emitting display panel and is reflected by at least one of a reflector or a cover glass associated with the apparatus. The method can further include analyzing by a controller the image received by the camera, and varying a level of at least one of (i) a gamma voltage used to generate a data voltage to be output to data lines included in the light emitting display panel, and (ii) one or more of driving voltages supplied to pixels included in the light emitting display panel.

19 Claims, 6 Drawing Sheets

(52) U.S. Cl.
CPC ............... *G09G 2320/0276* (2013.01); *G09G 2320/045* (2013.01); *G09G 2320/0693* (2013.01); *G09G 2330/028* (2013.01); *G09G 2360/147* (2013.01)

(56) References Cited

U.S. PATENT DOCUMENTS

| | | | | |
|---|---|---|---|---|
| 2012/0242710 | A1* | 9/2012 | Kang | G09G 3/3208 345/77 |
| 2013/0002145 | A1* | 1/2013 | Hwang | G09G 3/36 315/158 |
| 2021/0065625 | A1* | 3/2021 | Wang | G09G 3/3233 |
| 2021/0082373 | A1* | 3/2021 | Lou | G09G 5/10 |
| 2021/0241680 | A1* | 8/2021 | Ock | G09G 3/32 |
| 2022/0115456 | A1* | 4/2022 | Oh | G09G 3/3291 |
| 2022/0343836 | A1* | 10/2022 | An | G09G 3/006 |
| 2023/0215339 | A1* | 7/2023 | Yoon | G09G 3/2096 345/690 |

* cited by examiner

LUMINANCE DIFFERENCE CORRECTION METHOD AND LIGHT EMITTING DISPLAY APPARATUS USING THE SAME

CROSS-REFERENCE TO RELATED APPLICATIONS

This application claims priority to Korean Patent Application No. 10-2021-0194753 filed on Dec. 31, 2021 in the Republic of Korea, the entire contents of which are hereby expressly incorporated by reference into the present application.

BACKGROUND

Field of the Invention

The present disclosure relates to a method of correcting a luminance difference of an image and a light emitting display apparatus using the method.

Discussion of the Related Art

In light emitting display apparatuses driven at a low frequency, a refresh period and at least one anode reset period can be used and repeated. The refresh period is a period during which a pixel is charged with a data voltage and displays an image. The anode reset period is a period during which the image is continuously displayed.

In some cases, however, when such a light emitting display apparatus is continuously used, due to various causes, a defect can occur where the luminance of an image displayed during the anode reset period can be greater or less than the luminance of an image displayed during the refresh period. Due to this luminance difference, a phenomenon where the displayed images flicker can occur.

Further, when a light emitting display apparatus including a camera disposed at a position corresponding to a display area of the apparatus is continuously used, driving transistors in such area can be degraded. In some cases, a degradation can be severe in the pixels corresponding to the location of the camera. As such, the luminance corresponding to the camera area can be considerably reduced and due to this reduction, the quality and performance in the displaying of images in or around the camera area can be inferior or not as good in comparison to other display areas.

SUMMARY OF THE DISCLOSURE

Accordingly, the present disclosure is directed to providing a luminance difference correction method and a light emitting display apparatus using the same that substantially obviate one or more problems due to limitations and disadvantages of the related art.

An aspect of the present disclosure is directed to providing a luminance difference correction method and a light emitting display apparatus using the same, which can analyze an image input to a camera provided at a certain location (e.g., lower end) of a light emitting display panel and can vary a level of a gamma voltage used to generate a data voltage and/or driving voltages supplied to the pixels of the light emitting display apparatus.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a luminance difference correction method including inputting an output image, which is output from a camera region of a light emitting display panel and is reflected through a reflector or a cover glass, to a camera provided at a lower end of the light emitting display panel and analyzing, by using the controller, an image input to the camera to vary a level of at least one of a gamma voltage, used to generate a data voltage which is to be output to data lines included in the light emitting display panel, and driving voltages supplied to pixels included in the light emitting display panel.

In another aspect of the present disclosure, there is provided a light emitting display apparatus including a light emitting display panel including gate lines and data lines, a camera provided at a lower end of the light emitting display panel to receive an image which is output from a camera region of the light emitting display panel and is input to the light emitting display panel through a reflector or a cover glass, and a controller analyzing the image input to the camera to vary a level of at least one of a gamma voltage, used to generate a data voltage which is to be output to the data lines included in the light emitting display panel, and driving voltages supplied to pixels included in the light emitting display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
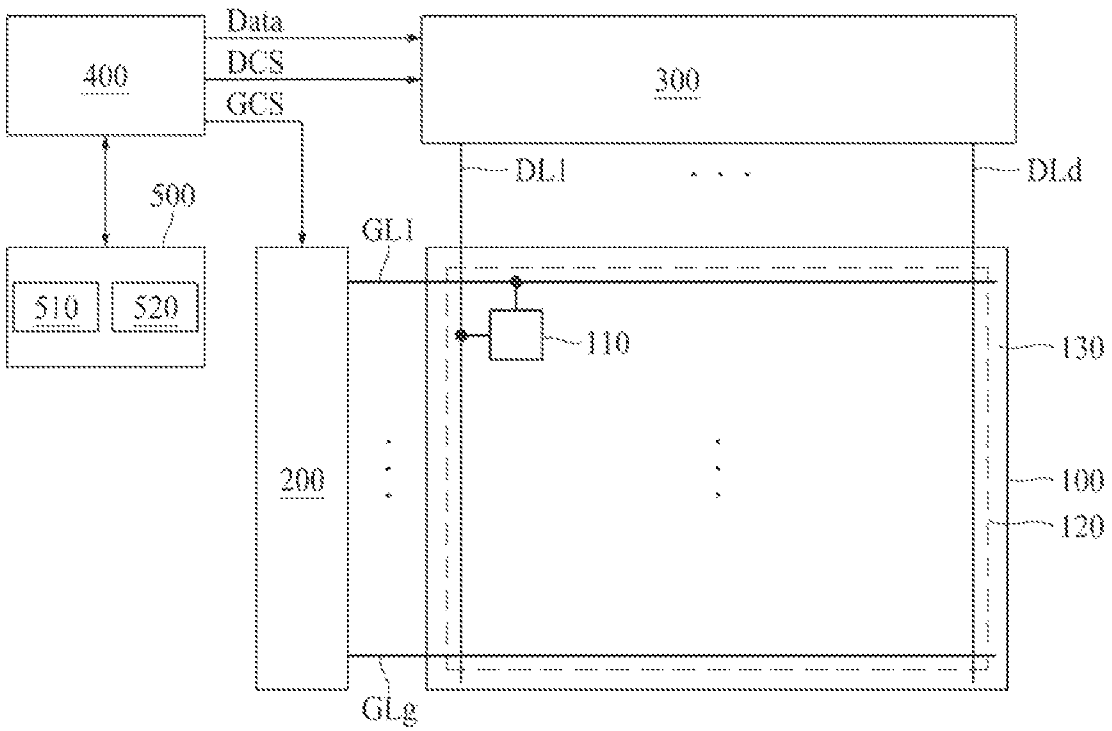
FIG. 1 is a diagram illustrating an example of a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description may be omitted or may be provided briefly. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," "above," "below" and "next," one or more other parts can be disposed between the two parts unless a more limiting term, such as "just" or "direct (ly)" is used.

In describing a time relationship, for example, when the temporal order is described as, for example, "after," "subsequent," "next," and "before," a case that is not continuous can be included unless a more limiting term, such as "just," "immediate (ly)," or "direct (ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, the embodiments of the present disclosure will be described in detail with reference to the accompanying drawings. All components of each light emitting display apparatus according to all embodiments of the present disclosure are operatively coupled and configured.

Figure 2:
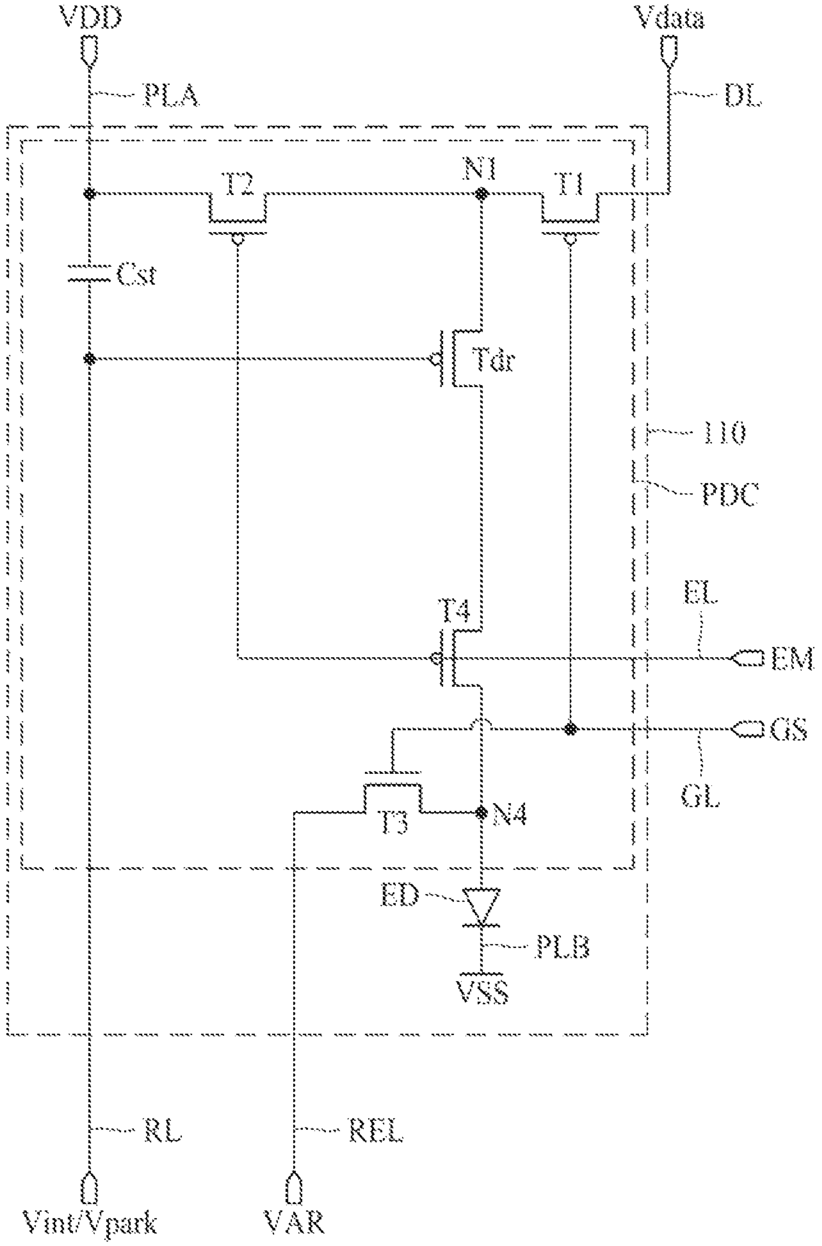
FIG. 2 is a diagram illustrating an example of a configuration of a pixel applied to a light emitting display apparatus according to an embodiment of the present disclosure.
Figure 3:
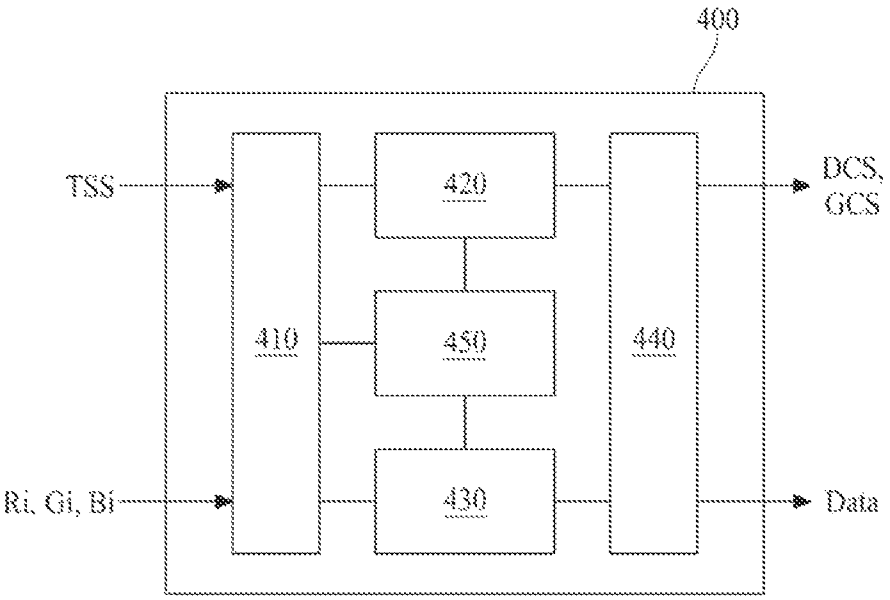
FIG. 3 is a diagram illustrating an example of a configuration of a controller applied to a light emitting display apparatus according to an embodiment of the present disclosure.
Figure 4:
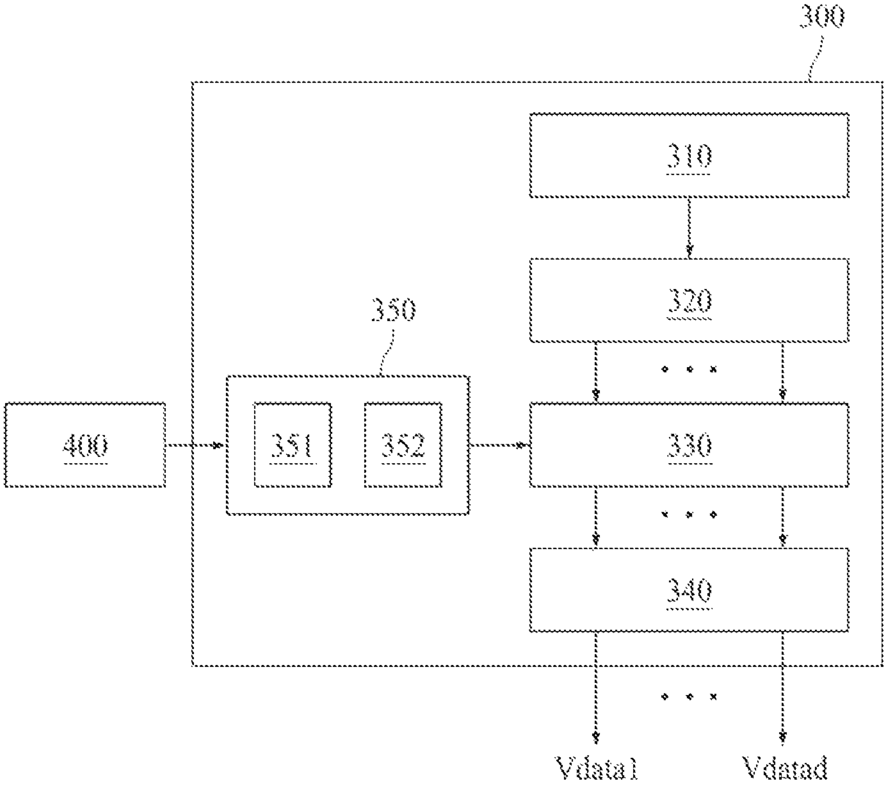
FIG. 4 is a diagram illustrating an example of a configuration of a data driver applied to a light emitting display apparatus according to an embodiment of the present disclosure.

FIG. 1 is a diagram illustrating an example of a configuration of a light emitting display apparatus according to an embodiment of the present disclosure, FIG. 2 is a diagram illustrating an example of a configuration of a pixel applied to a light emitting display apparatus according to an embodiment of the present disclosure, FIG. 3 is a diagram illustrating an example of a configuration of a controller applied to a light emitting display apparatus according to an embodiment of the present disclosure, and FIG. 4 is a diagram illustrating an example of a configuration of a data driver applied to a light emitting display apparatus according to an embodiment of the present disclosure.

The light emitting display apparatus according to one or more embodiments of the present disclosure, as illustrated in FIGS. 1 and 2, can include a display panel 100 including a plurality of pixels 110 each of which includes a light emitting device ED emitting light and a pixel driving circuit PDC driving the corresponding light emitting device ED, a gate driver 200 which supplies gate pulses/signals to a plurality of gate lines GL1 to GLg provided in the display panel 100, a data driver 300 which supplies data voltages/signals to a plurality of data lines DL1 to DLd provided in the display panel 100, a controller 400 which controls driving of the gate driver 200 and the data driver 300, and a power supply 500 which supplies power to the controller 400, the gate driver 200, the data driver 300, and the display panel 100, and other elements as needed.

The display panel 100 can include a display area 130 for displaying an image and a non-display area 130 surrounding an outer portion of the display area 120 or being adjacent to the display area 130. The non-display area 130 does not provide displaying of any images while the display area 130 provides displaying of images.

The gate lines GL1 to GLg, the data lines DL1 to DLd, and the pixels 110 can be provided in the display panel 100. A gate line and a data line can be connected to each of the pixels 110. The gate lines GL1 to GLg can be connected to the gate driver 200, and the data lines DL1 to DLd can be connected to the data driver 300. Regarding the gate lines and data lines, g and d can each be a natural number such as a positive integer greater than 2. The pixels 110 can be arranged in a matrix configuration or other suitable or known form.

Each of the pixels 110 included in the display panel 100, as illustrated in FIG. 2, can include the pixel driving circuit PDC and an emission area.

Particularly, referring to FIG. 2, each pixel 110 can have the configuration shown therein. Each pixel driving circuit PDC can include first to fourth transistors T1 to T4, a storage capacitor Cst, and a driving transistor Tdr. Further, the emission area of each pixel 110 can include the light emitting device ED.

The light emitting device ED can include one of an organic light emitting layer, an inorganic light emitting layer, and a quantum dot light emitting layer, or can include a stack or combination structure of an organic light emitting layer (or an inorganic light emitting layer) and a quantum dot light emitting layer.

The light emitting device ED can emit light corresponding to one of various colors such as red, green, and blue, or can emit white light.

The pixel driving circuit PDC can include the first transistor T1 which includes a first terminal, a gate connected to a gate line GL, and a second terminal connected to a data line DL; the second transistor T2 which includes a first terminal connected to a first voltage supply line PLA through which a first voltage VDD is supplied, a second terminal connected to the first terminal of the first transistor T1 via a node N1, and a gate connected to an emission line EL; a driving transistor Tdr which includes a first terminal connected to the first terminal of the first transistor T1, a second terminal connected to the fourth transistor T4, and a gate connected to the storage capacitor Cst; the fourth transistor T4 which includes a first terminal connected to the second terminal of the driving transistor Tdr, a gate connected to the emission line EL, and a second terminal connected to the light emitting device ED via a node N4; the third transistor T3 which includes a first terminal connected to the second terminal of the fourth transistor T4 at the node N4, a second terminal connected to a reference voltage line REL through which a reference voltage VAR is supplied, and a gate connected to the gate line GL; and the storage capacitor Cst connected to the first terminal of the second transistor T2 and the gate of the driving transistor Tdr.

The first transistor T1 can be turned on or off by a gate signal GS supplied through the gate line GL. When the first transistor T1 is turned on, a data voltage Vdata from the data line DL can be supplied to the driving transistor Tdr. The gate signal GS from the gate line GL can include a gate pulse for turning on the first transistor T1 and a gate off signal for turning off the first transistor T1.

The third transistor T3 can also be turned on or off by the gate signal GS supplied through the gate line GL. For example, the first transistor T1 and the third transistor T3 can be turned on or off by the same gate signal GS supplied through the gate line GL.

The second transistor T2 and the fourth transistor T4 can be turned on or off by the same emission signal EM supplied through the emission line EL.

The driving transistor Tdr can be driven with the data voltage Vdata and can control the amount of current supplied to the light emitting device ED.

The first to fourth transistors T1 to T4 and the driving transistor Tdr can each be a P type low temperature polysilicon (LTPS) transistor.

The first voltage VDD can be supplied to the driving transistor Tdr and the light emitting device ED through the first voltage supply line PLA.

A second voltage VSS can be supplied to the light emitting device ED through a second voltage supply line PLB.

The reference voltage VAR can be supplied to the third transistor T3 through the reference voltage line REL.

An initialization voltage Vint can be supplied to the gate of the driving transistor Tdr through an anode reset line RL. The initialization voltage Vint can be supplied to the pixel in a refresh period.

On the other hand, an anode reset voltage Vpark can affect a voltage at the gate of the driving transistor Tdr through the anode reset line RL. The anode reset voltage Vpark can be supplied to the pixel in an anode reset period.

Hereinafter, a light emitting display apparatus including the pixels 110 having the structure illustrated in FIG. 2 will be described as an example of the present disclosure. However, the present disclosure is not limited to the structure illustrated in FIG. 2. In this case, when the structure and the function of the pixel 110 are changed, the kinds of voltages supplied to pixels can be variously changed.

The controller 400 of FIG. 1 can have the configuration of the controller 400 shown in FIG. 3, and the data driver 300 of FIG. 1 can have the configuration of the data driver 300 shown in FIG. 4.

Particularly, referring to FIG. 3, the controller 400 can realign input video data Ri, Gi, and Bi transferred from an external system by using a timing synchronization signal TSS transferred from the external system, and can generate a data control signal DCS to be supplied to the data driver 300 and a gate control signal GCS to be supplied to the gate driver 200.

To this end, as illustrated in FIG. 3, the controller 400 can include a data aligner 430 which realigns the input video data Ri, Gi, and Bi to generate image data Data and supplies the image data Data to the data driver 300, a control signal generator 420 which generates the gate control signal GCS and the data control signal DCS by using the timing synchronization signal TSS, an input unit 410 which receives the timing synchronization signal TSS and the input video data Ri, Gi, and Bi transferred from the external system and respectively transfers the timing synchronization signal TSS and the input video data Ri, Gi and Bi to the control signal generator 420 and the data aligner 430, and an output unit 440 which supplies the data driver 300 with the image data Data generated by the data aligner 430 and the data control signal DCS generated by the control signal generator 420 and supplies the gate driver 200 with the gate control signals GCS generated by the control signal generator 420. The controller 400 can include a storage unit 450 for storing various information.

The external system can perform a function of driving the controller 400 and an electronic device including the light emitting display apparatus according to the present disclosure. For example, when the electronic device is a television (TV), the external system can receive various sound information, video information, and text information over a communication network and can transfer the received video information to the controller 400. In this case, the image information can include the input video data Ri, Gi, and Bi.

The data driver 300 can latch image data Data transferred from the controller 400 on the basis of a sampling signal, convert the latched image data into data voltages Vdata, and supply the data voltages Vdata to the data lines DL1 to DLd.

To this end, as illustrated in FIG. 4, the data driver 300 can include a shift register unit 310 which outputs the sampling signal, a latch unit 320 which latches the image data Data received from the controller 400, a digital-to-analog converter 330 which converts the image data Data, transferred from the latch unit 320, into the data voltage Vdata and outputs the data voltages Vdata, an output buffer 340 which outputs the data voltages Vdata1 . . . Vdatad, transferred from the digital-to-analog converter 330, to the data lines DL on the basis of a source output enable signal transferred from the controller 400, and a gamma voltage generator 350 which generates a gamma voltage used to generate the data voltages.

In this case, the gamma voltage generator 350 can vary a level of the gamma voltage on the basis of a gamma voltage control signal transferred from the controller 400. The gamma voltage control signal can be one of data control signals DCS.

The gamma voltage generator 350 can include a camera region generator 351 and a normal region generator 351. The camera region generator 351 generates a camera region gamma voltage used to generate data voltages which are to be supplied to pixels included in (e.g., corresponding to) a camera region of the display apparatus. The normal region generator 352 generates a normal region gamma voltage used to generate data voltages which are to be supplied to pixels included in a normal region of the display apparatus. The normal region can be regions (e.g., remainder of the display area) excluding the camera region, or a portion of the regions excluding the camera region. The camera region can be an area in which the camera is provided, or an area immediately around the camera. The normal region generator 352 can provide gamma voltages to the normal region (e.g., non-camera region) of the display panel, where, e.g., a gamma correction according to a known process can be performed in the data driver 300.

Regarding the camera region, for example, when data voltages Vdata to be supplied to the pixels included in the camera region are generated, the camera region generator 351 can transfer the camera region gamma voltage to the digital-to-analog converter 330 which in turn can generate the data voltage Vdata for the pixels associated with the camera region, e.g., according to a known process.

Moreover, when data voltages to be supplied to the pixels included in the normal region are generated, the normal region generator 352 can transfer the normal region gamma voltage to the digital-to-analog converter 330 which in turn can generate the data voltage Vdata for the pixels associated with the normal region, e.g., according to a known process.

On the other hand, the gate driver 200 can be configured as an integrated circuit (IC) and mounted in the non-display area 130 of the display panel 100. Further, the gate driver 200 can be directly embedded in the non-display area 130 by using a gate in panel (GIP) type. In a case which uses the GIP type, transistors configuring the gate driver 200 can be provided in the non-display area 130 through the same process as transistors included in each of the pixels 110.

The gate driver 200 can supply the gate pulses to the gate lines GL1 to GLg.

When the gate pulse generated by the gate driver 200 is supplied to gates of the switching transistors T1 to T4 included in the pixel 110, the switching transistors T1 to T4 can be turned on. Particularly, when the first transistor T1 is turned on, a data voltage Vdata supplied through the data line DL can be supplied to the pixel 110.

When the gate off signal generated by the gate driver 200 is supplied to the switching transistors T1 to T4, the switching transistors T1 to T4 can be turned off. Particularly, when the first transistor T1 is turned off, the data voltage Vdata may not be supplied to the pixel 110 any longer.

The gate signal GS supplied to the gate line GL can include the gate pulse and the gate off signal.

The power supply 500 can supply power to the gate driver 200, the data driver 300, and the controller 400 in addition to any other applicable elements.

Moreover, the power supply 500 can supply the pixel driving circuits PDC with various powers (for example, the first voltage VDD, the second voltage VSS, the initialization voltage Vint, the anode reset voltage Vpark, and the reference voltage VAR) needed for the pixel driving circuits PDC included in the display panel 100. In the present specification, each of the first voltage VDD, the second voltage VSS, the initialization voltage Vint, the anode reset voltage Vpark, and the reference voltage VAR can be referred to as a driving voltage.

The power supply 500 can include a camera region supply unit 510 and a normal region supply unit 520. The camera region supply unit 510 can generate camera region driving voltages, which are to be supplied to the pixels included in the camera region, among the driving voltages. The camera region driving voltages include one or more of the above-mentioned driving voltages such as a first voltage VDD, a second voltage VSS, an initialization voltage Vint, an anode reset voltage Vpark, and a reference voltage VAR, for the camera region. The normal region supply unit 520 can generate normal region driving voltages, which are to be supplied to the pixels included in the normal region, among the driving voltages. The normal region driving voltages include one or more of the above-mentioned driving voltages such as a first voltage VDD, a second voltage VSS, an initialization voltage Vint, an anode reset voltage Vpark, and a reference voltage VAR, for the normal region. The camera region and the normal region will be described in more detail below with reference to FIGS. 5 and 6.

Figure 5:
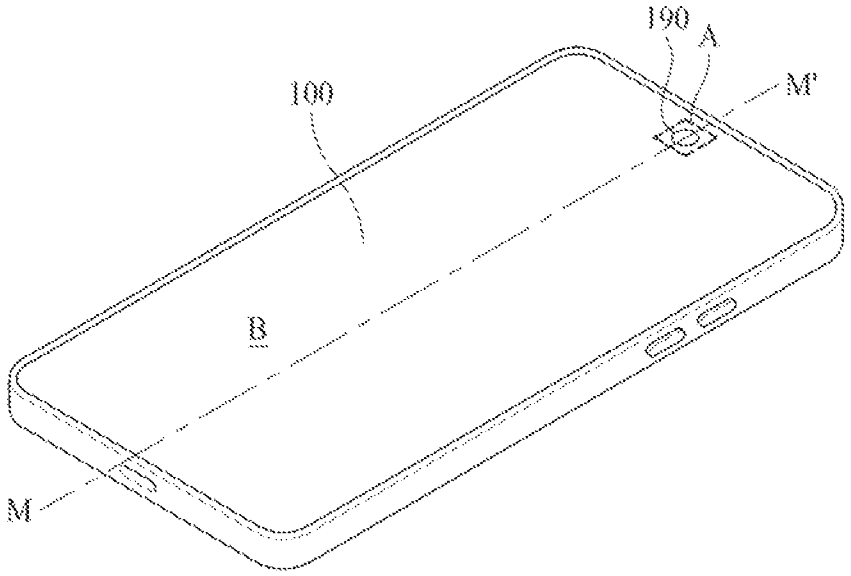
FIG. 5 is a perspective view illustrating an example of an external appearance of a light emitting display apparatus according to an embodiment of the present disclosure.
Figure 6:
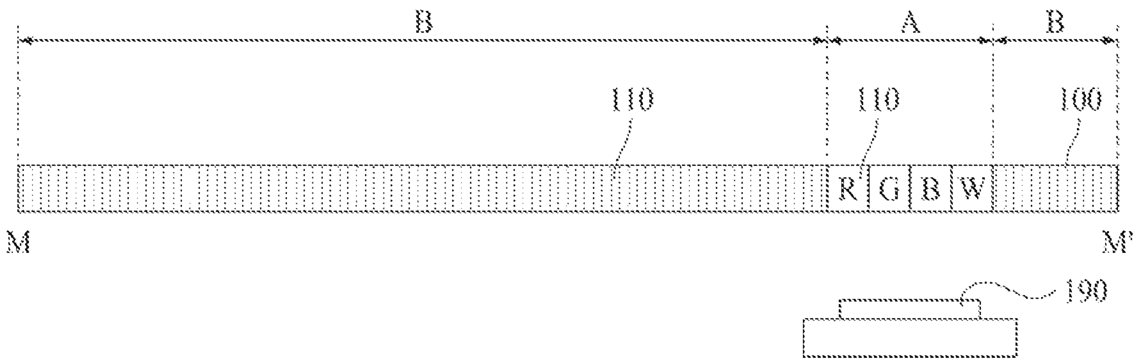
FIG. 6 is a cross-sectional view illustrating a camera and a light emitting display panel of the light emitting display apparatus along line M-M' of FIG. 5 according to an embodiment of the present disclosure.

FIG. 5 is a perspective view illustrating an example of an external appearance of a light emitting display apparatus according to an embodiment of the present disclosure. In FIG. 5, a smartphone (mobile terminal or mobile equipment) is illustrated as an example of the light emitting display apparatus according to the present disclosure. FIG. 6 is a cross-sectional view illustrating a camera and a light emitting display panel of the light emitting display apparatus according to the present disclosure, and particularly, illustrates a cross-sectional view of the light emitting display panel, taken along line M-M' of FIG. 5.

As described above, the light emitting display apparatus according to an example of the present disclosure can include a light emitting display panel 100 which can include the gate lines GL1 to GLg and the data lines DL1 to DLd, the controller 400, the gate driver 200, the data driver 300, and the power supply 500. The light emitting display apparatus further includes a camera 190. Further, other elements that are known to exist in mobile terminals can be included in the light emitting display apparatus, such as processor(s), sensors, speakers, a communication module, an input unit, an output unit, etc.

The camera 190, as illustrated in FIG. 6, can be provided at a lower end of the light emitting display panel 100, but can be disposed at another location.

The light emitting display panel 100, as illustrated in FIGS. 5 and 6, can include a camera region A corresponding to the camera 190 and a normal region B where the camera 190 is not provided. For example, the camera region A can correspond to an area associated with the location of the camera 190, and the normal region B can be one or more regions excluding the camera region A of the display panel 100. The entire display area, excluding the camera region A alone or in addition to any other non-displaying area(s), on the display panel 100 can be the normal region B. The camera region A is where the pixels 110 corresponding to the camera 190 (e.g., the pixels 110 disposed above the camera 190) are provided.

In some cases, when the camera 190 is provided at the lower end of the light emitting display panel 100, the image quality of the camera region A can be degraded by interference caused by lines (for example, the gate lines GL1 to GLg and the data lines DL1 to DLd) included in the light emitting display panel 100. Further, the transmittance of the camera region A should be higher than that of the normal region B, so that light can be transmitted to the camera 190 through the light emitting display panel 100.

Therefore, as illustrated in FIG. 6, the density of the pixels 110 of the camera region A in the light emitting display panel 100 can be set to be lower than the density of the pixels 110 of the normal region B.

For example, the camera region A can be transparent so that light can be transmitted to the camera 190 from the outside of the light emitting display apparatus, and lines for blocking light should be minimized. To this end, the density of the pixels 110 of the camera region A can be lower than the density of the pixels 110 of the normal region B, and each of the pixels 110 can include a portion which displays an image and a region where a transmittance is high. For instance, by having less pixels 110 in the camera region A than the pixels 110 in the normal region B with the camera region A being transparent or more transparent, the operation of the camera 190 is not interfered with the displaying operation of the pixels 110 in the camera region A according to the present disclosure.

Figure 7:
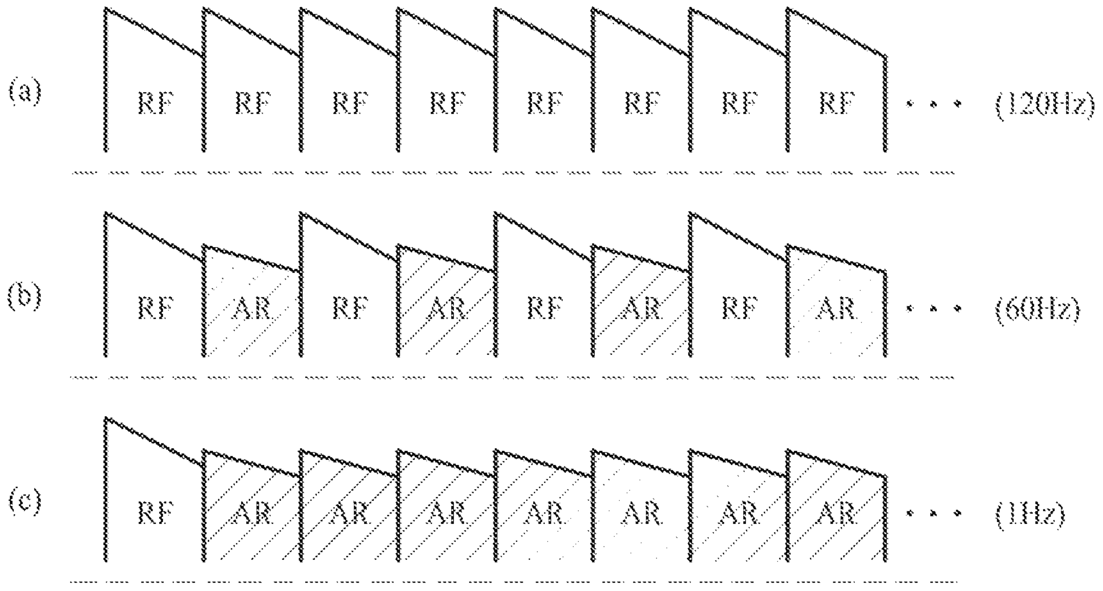
FIG. 7 is a diagram for describing an operating method of a light emitting display apparatus according to an embodiment of the present disclosure.
Figure 8:
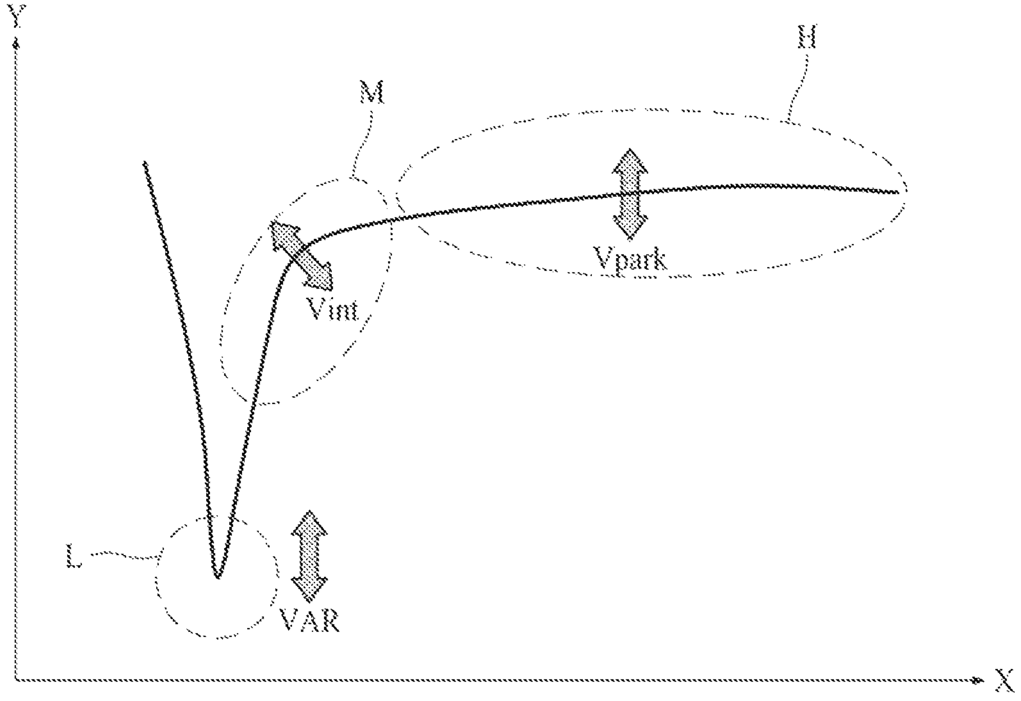
FIG. 8 is a diagram illustrating an example of a waveform of light output through a light emitting display apparatus according to an embodiment of the present disclosure.

FIG. 7 is a diagram for describing an operating method of a light emitting display apparatus according to the present disclosure, and FIG. 8 is a diagram illustrating an example of a waveform of light output through a light emitting display apparatus according to the present disclosure. In the following description, one frame period can denote a period where gate pulses are supplied to the gate lines GL1 to GLg included in the display panel 100, and thus, one image is displayed by the display panel 100.

Here, (a) in FIG. 7 illustrates a first method of displaying an image by using the light emitting display apparatus generally.

Referring to (a) of FIG. 7, the light emitting display apparatus can display an image at every one frame period. A period where an image is displayed can be referred to as a refresh period RF. For example, an image can be repeatedly displayed at every one frame period. In this case, when the light emitting display apparatus is driven at a frequency of 120 Hz, 120 images can be displayed for 1 second.

Further, (b) in FIG. 7 illustrates a second method of displaying an image by using the light emitting display apparatus according to an embodiment of the present disclosure.

In the light emitting display apparatus, as illustrated in (b) of FIG. 7, one frame can be divided into the refresh period RF and the anode reset period AR.

In the refresh period RF, data voltages Vdata supplied through the data lines DL1 to DLd can be charged into the gates of the driving transistors Tdr, and images can be displayed with data voltages Vdata charged into the driving transistors Tdr.

In the anode reset period AR, data voltages may not be supplied through the data lines DL1 to DLd. In the anode reset period AR, images can be displayed with data voltages which are charged into the driving transistors Tdr in the refresh period RF.

In this case, even when the refresh period RF and the anode reset period AR occur 120 times as the light emitting display apparatus is driven at a frequency of 120 Hz, 60 images can be substantially displayed for 1 second. Accordingly, it can be understood that the light emitting display apparatus is driven at a frequency of 60 Hz.

Furthermore, (c) in FIG. 7 illustrates a third method where one refresh period RF occurs once during a 1 second period and anode reset periods AR are repeated in the remainder of that 1 second period.

In this case, even when the refresh period RF occurs once and the anode reset period AR occur 119 times as the light emitting display apparatus is driven at a frequency of 120 Hz, one image can be substantially displayed for 1 second. Accordingly, it can be understood that the light emitting display apparatus is driven at a frequency of 1 Hz.

Hereinafter, a method of driving the light emitting display apparatus according to the present disclosure on the basis of the second and third methods illustrated in (b) and (c) of FIG. 7 will be described as a low frequency driving method. That is, the light emitting display apparatus according to the present disclosure can be driven at a low frequency, e.g., a frequency of at or less than 60 Hz, or can be driven at a frequency of 1 Hz.

On the other hand, when a general light emitting display apparatus is continuously driven based on the method illustrated in (b) or (c) of FIG. 7 according to a related art, due to various causes such as variations of threshold voltages of driving transistors Tdr, the luminance of an image displayed in an anode reset period AR can be greater or less than that of an image displayed in a refresh period RF, and due to this, a phenomenon where an image is flickering can occur or can be severe. To address this limitation associated with the related art, the present disclosure operating in the method illustrated in (b) or (c) of FIG. 7 provides a luminance difference correcting method using the display apparatus of FIGS. 1-6, which will be described in more detail below referring to FIGS. 8-10.

Referring to FIG. 8, a relationship shown in this figure can be obtained as a result of the analysis of a relationship between the initialization voltage Vint, the anode reset voltage Vpark, and the reference voltage VAR described above with reference to FIG. 2 and a luminance waveform of light emitted from the light emitting display apparatus. In FIG. 8, the abscissa axis X denotes a time, and the ordinate axis Y denotes luminance of light. Further, a luminance waveform shown in FIG. 8 represents a luminance waveform of light checked in one refresh period RF or one anode reset period AR.

For example, in the light emitting display apparatus driven at a low frequency (e.g., according to the method (b) or (c) of FIG. 7), when the refresh period RF or the anode reset period AR starts, light having a luminance of a small magnitude can be emitted, and the luminance can progressively increase over time, whereby a constant luminance can be maintained.

In the following description, in the luminance waveform of light shown in FIG. 8, a region where the light having a low luminance can be referred to as a low luminance region L, a region where the luminance increases progressively can be referred to as a middle luminance region M, and a region where light having a high luminance can be referred to as a high luminance region H.

In this case, it can be seen that the magnitude of luminance of the low luminance region L can be relevant to the reference voltage VAR among the initialization voltage Vint, the anode reset voltage Vpark, and the reference voltage VAR described above with reference to FIG. 2. Further, the magnitude of luminance of the middle luminance region M can be relevant to the initialization voltage Vint, whereas the magnitude of luminance of the high luminance region H can be relevant to the anode reset voltage Vpark. As mentioned above, the voltages VAR, Vint and Vpark are driving voltages for the pixels of the display panel.

In this case, the magnitude of luminance of the low luminance region L output from the light emitting display apparatus driven at a low frequency can be controlled by controlling the level of the reference voltage VAR which is supplied to an anode of the light emitting device ED in the refresh period RF or the anode reset period AR.

Further, the shape of a luminance rising curve and the magnitude of luminance of the middle luminance region M output from the light emitting display apparatus can be controlled by controlling the level of the initialization voltage Vint which is supplied to the gate of the driving transistor Tdr in the refresh period RF.

In addition, the magnitude of luminance of the high luminance region H can be controlled by controlling the level of the anode reset voltage Vpark which is supplied to the gate of the driving transistor Tdr in the anode reset period AR.

Therefore, the magnitude and the shape of light emitted in the refresh period RF and the anode reset period AR can be controlled by controlling at least one of the initialization voltage Vint, the anode reset voltage Vpark, and the reference voltage VAR (driving voltages) supplied to the pixels of the display panel. Accordingly, a luminance difference of light emitted in the refresh period RF or the anode reset period AR can be minimized or prevented in the present disclosure.

For example, the present disclosure can control at least one of the initialization voltage Vint, the anode reset voltage Vpark, and the reference voltage VAR supplied to the pixels to control the magnitude and the shape of light emitted in the refresh period RF and/or the anode reset period AR, thereby minimizing a luminance difference of light emitted in the refresh period RF and/or the anode reset period AR.

Particularly, the present disclosure can provide an improved method which prevents or minimizes flickers from occurring when a light emitting display apparatus is continuously used.

Moreover, the present disclosure can provide an improved method which compensates for luminance which may be reduced when the luminance of the camera region A is reduced because the driving transistors Tdr of the camera region A can be degraded due to overuse.

Accordingly, a method of correcting a luminance difference in the refresh period RF and the anode reset period AR by using the light emitting display apparatus according to the present disclosure will be described in more detail with reference to FIGS. 1 to 10.

Figure 9:
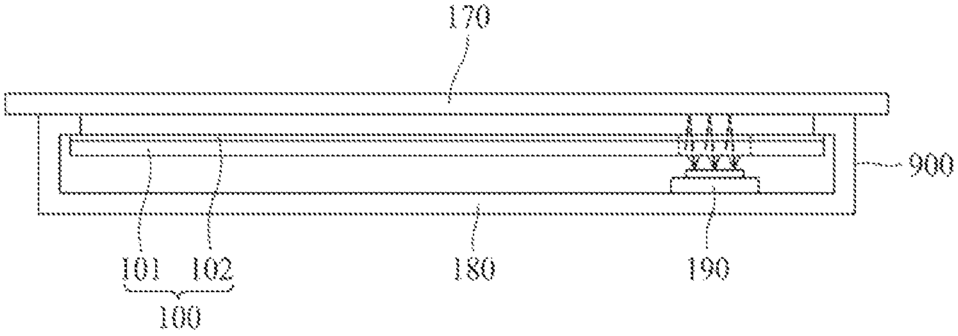
FIGS. 9 and 10 are diagrams for describing a luminance difference correction method according to an embodiment of the present disclosure.
Figure 10:
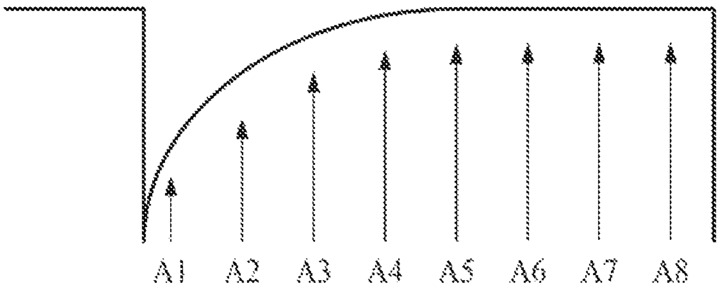

FIGS. 9 and 10 are diagrams for describing a luminance difference correction method according to an embodiment of the present disclosure. FIG. 9 shows an electronic device 900 including the light emitting display apparatus of the present disclosure.

In FIG. 9, a reference numeral 180 can refer to a case which supports the camera 190 and the light emitting display panel 100, a reference numeral 101 can refer to a substrate including a light emitting device, and a reference numeral 102 can refer to a cover glass provided on a substrate. The light emitting display apparatus shown in FIG. 9 can be implemented in the apparatus of FIG. 1-6 or other types of display apparatuses. Further, the luminance difference correction method of the present disclosure is applicable to the display apparatus of FIG. 1-9 or other suitable display apparatuses.

The light emitting display apparatus according to the present disclosure which will be described below, as described above with reference to (b) and (c) in FIG. 7, can be driven at a low frequency of 60 Hz or less (e.g., at 1 Hz).

Moreover, in the light emitting display apparatus according to the present disclosure, the refresh period RF where an image is displayed with data voltages supplied to the data lines DL1 to DLd and the anode reset period AR where an image is displayed with data voltages charged in the refresh period RF can be repeated or repeatedly provided.

For example, in the present disclosure, the refresh period RF where an image is displayed as a data voltage is charged into a pixel included in the light emitting display panel and at least one anode reset period AR where the image displayed in the refresh period RF is continuously displayed can be repeated.

In the example of FIG. 9, a reflector 170 and/or a cover glass 102 can be provided in the display apparatus having the camera 190. The camera 190 can receive an image back from the camera region A, where this image can be an image reflected from the reflector and/or cover glass 102. This image received by the camera 190 can then be analyzed by the controller 400 to provide the luminance difference compensation according to the luminance difference correction method of the present disclosure.

Particularly, the luminance difference correction method according to the present disclosure can include a step (step A) of inputting an output image, which is output from the camera region A of the light emitting display panel 100 and is reflected through the reflector 170 and/or the cover glass 102, to the camera 190 provided at a lower end of the light emitting display panel 100; and (b) a step (step B) of analyzing, by using the controller 400, the image received by the camera 190 to vary a level of at least one of (i) the gamma voltage used to generate a data voltage Vdata to be output to the data lines DL1 to DLd included in the light emitting display panel 100 and (ii) one or more of the driving voltages Vint, Vpark, and VAR supplied to the pixels 110 included in the light emitting display panel.

First, the step B of varying the level of the gamma voltage (i part) can include a step (B1) of comparing the luminance of an image, input to the camera 190, with the luminance of input image data corresponding to the output image by using the controller 400; and a step (B2) of shifting, by using the controller 400, a level of the gamma voltage to a predetermined level when the luminance of the image received by the camera is less than that of input image data (Ri, Gi, Bi) as a result of the comparison in the step B1. The shifted (or corrected) gamma voltage, which can be generated by the gamma voltage generator 350, can then be applied to the digital-to-analog converter 330 to generate the appropriate data voltage Vdata, which is then supplied to the data lines DL1 to DLd in the data driver 300.

In the step B2 of shifting the level of the gamma voltage to the predetermined level, a level of a camera region gamma voltage input to the camera region A can be shifted to the predetermined level. For instance, the camera region generator 351 can generate the shifted (corrected) gamma voltage to the digital-to-analog converter 330 in FIG. 4.

To this end, in a process of manufacturing the light emitting display apparatus, information about gamma voltages for compensating for various luminance sensed in the camera region A can be stored or prestored through various tests and simulations.

For example, when the gamma voltage generated by the gamma voltage generator 350 is 1 V (1 volt), light having a luminance corresponding to an input image having 100 gray level is output from the pixels included in the camera region A, and the luminance of light which is reflected by the reflector 170 or the cover glass 102 after being output from the camera region A and is incident on the camera region A is 90 gray level, then the gamma voltage can be shifted or corrected to 1.5 V. Thereafter, when the same process is performed again, the luminance of light incident on the camera region A is compensated and can be 100 gray level. In this case, the input image data (Ri, Gi, Bi) can be 100 gray level, the luminance of the incident light can be 90 gray level, and the shifted gamma voltage can be 1.5 V, and thus, such pieces of information can be mapped as one piece of information and can be stored or prestored in the storage unit 450.

For example, various gray levels of input image data (Ri, Gi, Bi), gray levels of light collected through the camera 190, and information about gamma voltages for compensating for differences between abovementioned gray levels can be stored or prestored, and updated in the storage unit 450, and can be then used in the luminance difference correction method of the present disclosure.

In this case, levels of gamma voltages for compensating for the differences between the various gray levels of the input image data and the gray levels of the light collected through the camera 190 can each be a predetermined level of the gamma voltage. In the embodiment, the predetermined level of the gamma voltage can be 1.5 V.

To provide an additional description, the luminance of light output from the camera region A can be less than the luminance of light output from the normal region B, and in order to compensate for such a luminance difference, input image data Ri, Gi, and Bi corresponding to pixels included in the camera region A can vary to have a luminance which is greater than that of input image data Ri, Gi, and Bi corresponding to pixels included in the normal region B.

In this case, driving transistors Tdr included in the camera region A can be more quickly degraded than driving transistors Tdr included in the normal region B. Therefore, when images based on the same input image data are output from the camera region A and the normal region B after the light emitting display apparatus is continuously used, the luminance of the camera region A can be less than that of the normal region B.

In order to solve or address this issue, additionally, the present disclosure can vary a level of the camera region gamma voltage used to generate data voltages corresponding to the camera region A, on the basis of processes described above.

For example, when the luminance of the camera region A is reduced because the driving transistors Tdr of the camera region A maybe were degraded, then the luminance of the camera region A may not increase by varying the luminance of input image data Ri, Gi, and Bi corresponding to the camera region A, but can increase by totally increasing a level of the gamma voltage associated with the camera region A according to the present disclosure.

Therefore, when a level of the camera region gamma voltage is determined through the processes described above, the camera region generator 351 can be controlled to generate and output a corresponding (shifted/compensated) camera region gamma voltage to the digital-to-analog converter 330 in the data driver 300.

To provide an additional description, when an electric device including the light emitting display apparatus according to the present disclosure is continuously used, the driving transistors Tdr included in the camera region A can be degraded, and due to this, a limitation can occur where the luminance of the camera region A is less than that of the normal region B.

In such a case, in one example, a user or any other person which has noticed this issue, as illustrated in FIG. 9, can place the reflector 170 ahead of the cover glass 102, and then, can allow a luminance compensation mode, where the operations described above are performed, to be executed. The luminance compensation mode can be executed in the electronic device 900 including the light emitting display apparatus according to the present disclosure. For example, the electronic device 900 can be an apparatus including the light emitting display apparatus according to the present disclosure, and for example, can be a smartphone.

Based on the luminance compensation mode, the controller 400 can select a camera region gamma voltage for increasing the luminance of the camera region A (e.g., compared to the normal region B) and can control the camera region generator 351 of the gamma voltage generator 350 to generate and output the selected camera region gamma voltage which is used to generate the compensated Vdata.

For example, if the luminance of the camera region A is reduced since the light emitting display apparatus is used for a long time, it can be checked through various tests and simulations that the luminance of the camera region A can increase again by varying a level of the camera region gamma voltage, and based on such a characteristic, the present disclosure can be used.

In another example, the luminance difference correction method of the present disclosure can be performed in a process of manufacturing the light emitting display apparatus.

Second, the step B of varying the levels of driving voltages (ii part) can include a step of comparing a reference luminance waveform with a luminance waveform of an image input to the camera 190 by using the controller 400 and a step of shifting a level of at least one of the driving voltages, supplied to the pixels, to a predetermined level by using the controller 400 when the luminance waveform differs from the reference luminance waveform.

In the step of shifting the level of at least one of the driving voltages to the predetermined level, a level of at least one of camera region driving voltages input to the camera region A can be shifted (or changed) to the predetermined level.

In this case, based on a region-based feature of a luminance waveform, one camera region driving voltage can be selected from among the camera region driving voltages, and a level of the selected camera region driving voltage can be shifted/changed to the predetermined level.

To this end, in a process of manufacturing the light emitting display apparatus, information about a relationship between a luminance waveform and driving voltages can be analyzed through various tests and simulations, and such pieces of information relevant thereto can be stored or prestored in the storage unit 450, which can be used later in the luminance difference correction method of the present disclosure.

For example, various information about a relationship between the driving voltages Vint, Vpark, and VAR and a luminance waveform can be generated based on principles described above with reference to FIG. 8, and various information about the levels of the driving voltages Vint, Vpark, and VAR based on a region-based feature of a luminance waveform can be stored or prestored in the storage unit 450.

In this case, the reference luminance waveform can be a waveform which is checked as shown in FIG. 8 in a process of manufacturing the light emitting display apparatus, and particularly, can be a reference luminance waveform in the camera region A.

For example, when the reference luminance waveform is a waveform shown in FIG. 8 (e.g., prestored during the manufacturing stage or at other time) and a luminance waveform collected through the method illustrated in FIG. 9 in the light emitting display apparatus during normal operations and use (e.g., collected after the manufacturing stage) is a waveform shown in FIG. 10, the controller 400 can analyze the reference luminance waveform and the collected luminance waveform and can compare such luminance with the reference luminance to check for a region where the luminance is reduced or affected.

In this case, the luminance waveform shown in FIG. 10 can be a waveform which is collected by photographing light, output from the light emitting display panel 100 in the refresh period RF or the anode reset period AR, eight times by using the camera 190, e.g., by the method of FIG. 7 (*b*) or (*c*), and FIG. 9.

For example, in the luminance waveform shown in FIG. 10, a first captured region A1 can be or correspond to the low luminance region L described above with reference to FIG. 8, a second captured region A2 and a third captured region A3 can be or correspond to the middle luminance region M, and fourth to eighth captured regions A4 to A8 can be or correspond to the high luminance region H.

In this case, in one example, after comparing with the reference luminance waveform, the controller 400 can increase or decrease a level of the reference voltage VAR supplied to the camera region A when the luminance of the low luminance region L is changed, the controller 400 can increase or decrease a level of the initialization voltage Vint supplied to the camera region A when the luminance of the middle luminance region M is changed, and the controller 400 can increase or decrease a level of the anode reset voltage Vpark when the luminance of the high luminance region H is changed.

In one or more examples, a level of at least one driving voltage among the driving voltages mentioned above can be varied in the luminance difference compensation method of the present disclosure.

In some example, levels (predetermined level) of the driving voltages to increase or decrease, which are used in the luminance difference correction/compensation method of the present disclosure, can be set through various tests and simulations in a manufacturing process, and then, can be set and/or updated in the storage unit 450.

For example, levels of the driving voltages for compensating for a luminance difference can be previously set (e.g., as the predetermined level) based on the change degree of a luminance waveform for each region (e.g., camera region A, normal region B, etc.) and can be stored in the storage unit 450. Based on a changed region and a changed degree of a checked luminance waveform, the controller 400 can then select at least one driving voltage from among various driving voltages and then shifts or varies the level of the selected at least one driving voltage to the predetermined level.

To provide an additional description, when the light emitting display apparatus according to the present disclosure is driven at a low frequency as described above with reference to (b) or (c) of FIG. 7 and is driven for a long time, due to various causes such as variations of threshold voltages of driving transistors Tdr, then the luminance of an image displayed in the anode reset period AR can be greater or less than that of an image displayed in the refresh period RF, and due to this, image flickering can occur. Occurrence of flickers can denote that the luminance of a luminance waveform is more reduced than that of the reference luminance waveform.

Then a user or another member which has checked this issue, as illustrated in FIG. 9, can place the reflector 170 ahead of the cover glass 102 of the light emitting display apparatus according to one example of the present disclosure, and then, can allow the luminance compensation mode, where operations described above are performed, to be executed in the light emitting display apparatus.

Based on the luminance compensation mode, the controller 400 can check a luminance waveform of the camera region A and can compare the checked luminance waveform with the reference luminance waveform.

Based on a changed region and a changed degree of a checked luminance waveform, the controller 400 can select at least one driving voltage from among various driving voltages and can shift a level of the selected at least one driving voltage to the predetermined level.

To this end, the controller 400 can control the camera region supply unit 510 of the power supply 500, and particularly, can vary at least one of the driving voltages Vint, Vpark, and VAR output to the pixels 110 by controlling the camera region supply unit 510.

Accordingly, a luminance waveform can be changed to a form similar to the reference luminance waveform, and thus, flickers can decrease or minimized.

According to the present disclosure, whenever the luminance of the camera region A is reduced (e.g., due to a degradation in driving transistors), the luminance of the camera region A can be increased again. As a result, even when the light emitting display apparatus is used at a low frequency for a long time, flickers may not occur or can be minimized in the camera region A.

According to the present disclosure, when flickers occur in a camera region (e.g., because a light emitting display apparatus is used by a user for a long time), a luminance waveform output from the camera region of the light emitting display apparatus can be detected by using a camera embedded in the light emitting display apparatus, and thus, the levels of driving voltages supplied to pixels can be re-set or adjusted to compensate for the luminance difference. Accordingly, flickers can be removed or minimized.

Moreover, when the luminance of the camera region is reduced (e.g., because the light emitting display apparatus is used by the user for a long time), the luminance output from the camera region of the light emitting display apparatus can be detected by using the camera embedded in the light emitting display apparatus, and thus, the level of a gamma voltage used to generate a data voltage can be varied/adjusted to compensate for the luminance difference. Accordingly, the luminance of the camera region can increase to enhance the display quality and performance.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A luminance difference correction method for an apparatus including a light emitting display panel, a controller, and a camera disposed adjacent to the light emitting display panel, the luminance difference correction method comprising:

- receiving, by the camera, an image, which is output from a camera region of the light emitting display panel and then reflected by at least one of a reflector or a cover glass associated with the apparatus, when the light emitting display panel is operating to have at least one refresh period and a plurality of anode reset periods, per each one frame period,
- wherein a pixel of the camera region includes a pixel driving circuit and a light emitting device,
- wherein the pixel driving circuit includes a first voltage supply line, a second voltage supply line, and a driving transistor,
- wherein the first voltage supply line supplies a first power voltage to the driving transistor, the second voltage supply line supplies a second power voltage to the light emitting device, and the driving transistor drives the light emitting device; and
- analyzing, by the controller, the image received by the camera from the camera region, and varying a level of (i) a gamma voltage used to generate a data voltage to be output to data lines corresponding to the camera region of the light emitting display panel, and (ii) two or more of driving voltages supplied to pixels corresponding to the camera region of the light emitting display panel,
- wherein the driving voltages include:
  - a reference voltage supplied to the pixel of the camera region,
  - an initialization voltage supplied to the pixel of the camera region in the refresh period, and
  - an anode reset voltage supplied to the pixel of the camera region in one of the anode reset periods, and
- wherein the driving voltages exclude the first and second power voltages.

2. The luminance difference correction method of claim 1, wherein the analyzing and the varying the level of the gamma voltage and the two or more of the driving voltages comprise:

- comparing, by the controller, a luminance of the image received by the camera, with a luminance of original input image data of the camera region; and
- varying, by the controller, a level of the gamma voltage to a predetermined level when the comparing indicates that the luminance of the image received by the camera is less than the luminance of the original input image data of the camera region.

3. The luminance difference correction method of claim 2, wherein the varying the level of the gamma voltage to the predetermined level comprises:

- shifting a level of a camera region gamma voltage, which is used to generate data voltages corresponding to the camera region, to the predetermined level.

4. The luminance difference correction method of claim 2, wherein the analyzing and the varying the level of the gamma voltage and the two or more of the driving voltages comprise:

- comparing, by the controller, a reference luminance waveform with a luminance waveform of the image received by the camera; and
- varying, by the controller, a level of at least one of the driving voltages, supplied to the pixels, to the predetermined level when the comparing indicates that the luminance waveform differs from the reference luminance waveform.

5. The luminance difference correction method of claim 4, wherein the varying the level of at least one of the driving voltages to the predetermined level comprises:

- shifting a level of at least one of camera region gamma voltages, input to the camera region, to the predetermined level.

6. The luminance difference correction method of claim 5, wherein, in the shifting, based on a region-based feature of the luminance waveform, one camera region driving voltage is selected from among the camera region driving voltages, and a level of the selected camera region driving voltage is shifted to the predetermined level.

7. The luminance difference correction method of claim 1, wherein the light emitting display panel is driven at a frequency of 60 Hz or less.

8. The luminance difference correction method of claim 7, wherein when the light emitting display panel is driven at the frequency of 60 Hz or less, a refresh period where an image is displayed as a data voltage is charged into a pixel included in the light emitting display panel and at least one anode reset period where the image is continuously displayed are repeated.

9. The luminance difference correction method of claim 1, further comprising:

- prestoring, in a storage unit of the apparatus, information about a relationship between a luminance wave form associated with the image received by the camera, and at least one of the gamma voltage and the driving voltages.

10. The luminance difference correction method of claim 9, wherein the prestoring is performed during a manufacturing process of the apparatus.

11. A light emitting display apparatus comprising:

- a light emitting display panel including pixels, gate lines and data lines;
- a camera provided at a camera region of the light emitting display panel, and configured to receive an image, which is output from the camera region of the light emitting display panel and then reflected by at least one of a reflector or a cover glass; and
- a controller configured to analyze the image received by the camera from the camera region when the light emitting display panel is operating to have at least one refresh period and a plurality of anode reset periods, per each one frame period, wherein a pixel of the camera region includes a pixel driving circuit and a light emitting device, wherein the pixel driving circuit includes a first voltage supply line, a second voltage supply line, and a driving transistor, wherein the first voltage supply line supplies a first power voltage to the driving transistor, the second voltage supply line supplies a second power voltage to the light emitting device, and the driving transistor drives the light emitting device, and vary a level of (i) a gamma voltage used to generate a data voltage to be output to the data lines corresponding to the camera region of the light emitting display panel, and (ii) two or more of driving voltages supplied to the pixels corresponding to the camera region of the light emitting display panel, wherein the driving voltages include:

a reference voltage supplied to the pixel of the camera region, an initialization voltage supplied to the pixel of the camera region in the refresh period, and an anode reset voltage supplied to the pixel of the camera region in one of the anode reset periods, and wherein the driving voltages exclude the first and second power voltages.

12. The light emitting display apparatus of claim 11, wherein the reflector is disposed ahead of the cover glass, and a luminance compensation mode is executed in the light emitting display apparatus when the controller varies the level of the gamma voltage and the two or more of the driving voltages.

13. The light emitting display apparatus of claim 11, wherein the controller comprises a storage unit, and wherein in a process of manufacturing the light emitting display apparatus, information about a relationship between a luminance wave form of the image received by the camera, and at least one of the gamma voltage and the driving voltages is stored in the storage unit.

14. The light emitting display apparatus of claim 11, further comprising:

a data driver configured to supply data signals to the data lines, wherein the data driver includes a gamma voltage generator including:

a camera region generator configured to generate a gamma voltage for the camera region of the light emitting display panel, and a non-camera region generator configured to generate a gamma voltage for a non-camera region of the light emitting display panel, and wherein the camera region generator, under control of the controller, changes the level of the gamma voltage used to generate the data voltage to be output to the data lines, for the camera region of the light emitting display panel.

15. The light emitting display apparatus of claim 11, further comprising:

a power supply unit including a camera region supply unit and a non-camera region supply unit, wherein the camera region supply unit, under control of the controller, changes the level of the two or more of the driving voltages supplied to the pixels, for the camera region of the light emitting display panel.

16. A method for compensating for a luminance difference in an apparatus including a display panel, a controller, and a camera disposed adjacent to the display panel, the method comprising:

obtaining, by the camera, image data of a camera region of the display panel, wherein the display panel includes the camera region where the camera is disposed and a non-camera region adjacent to the camera region, wherein a pixel of the camera region includes a pixel driving circuit and a light emitting device, wherein the pixel driving circuit includes a first voltage supply line, a second voltage supply line, and a driving transistor, wherein the first voltage supply line supplies a first power voltage to the driving transistor, the second voltage supply line supplies a second power voltage to the light emitting device, and the driving transistor drives the light emitting device;

comparing, by the controller, the image data of the camera region with prestored reference data; and varying (i) a gamma voltage used to generate a data voltage for data lines corresponding to the camera region of the display panel, and (ii) two or more of driving voltages to be supplied to pixels corresponding to the camera region of the display panel, based on a result of the comparing, wherein the driving voltages include:

a reference voltage supplied to the pixel of the camera region, an initialization voltage supplied to the pixel of the camera region in a refresh period, and an anode reset voltage supplied to the pixel of the camera region in an anode reset period, and wherein the driving voltages exclude the first and second power voltages.

17. The method of claim 16, wherein the apparatus further includes a data driver configured to supply data signals to the data lines, and the data driver includes a camera region generator configured to generate a gamma voltage for the camera region and a non-camera region generator configured to generate a gamma voltage for the non-camera region, and wherein the varying includes changing, by the camera region generator, a level of the gamma voltage used to generate the data voltage for the data lines, for the camera region.

18. The method of claim 16, wherein the apparatus further includes a power supply unit including a camera region supply unit and a non-camera region supply unit, and wherein the varying includes changing, by the camera region supply unit, a level of each of the two or more of the driving voltages to be supplied to the pixels, for the camera region.

19. The method of claim 16, wherein the prestored reference data is obtained and stored in a storage unit of the apparatus during a manufacturing stage of the apparatus.

* * * * *